Nov. 12, 1968     V. J. CARPENTER ET AL     3,410,629
ZOOM TYPE ANAMORPHIC EYEPIECE
Filed March 26, 1965
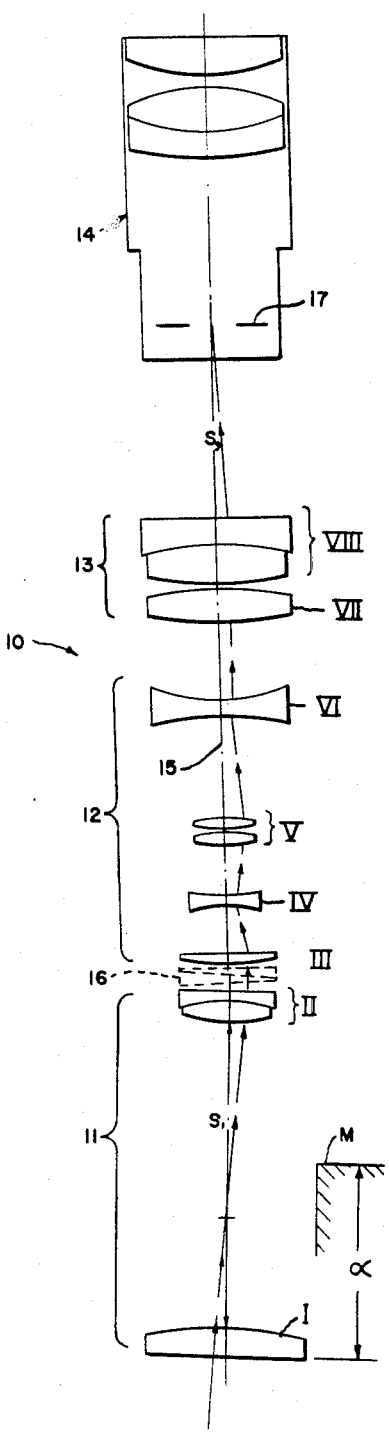
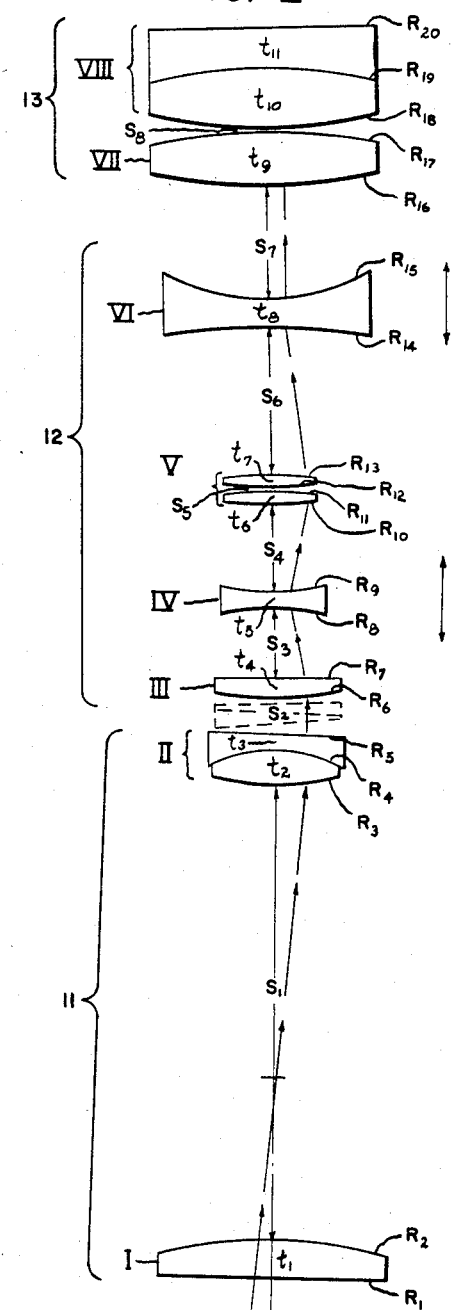
INVENTORS
VANCE J. CARPENTER
JOHN M. SIMPSON JR.
GEORGE F. ZIEGLER
BY Frank C. Parker
ATTORNEY

United States Patent Office 3,410,629
Patented Nov. 12, 1968

3,410,629
ZOOM TYPE ANAMORPHIC EYEPIECE
Vance J. Carpenter, Irondequoit, John M. Simpson, Jr., Chili, and George F. Ziegler, Gates, N.Y., assignors to Bausch & Lomb Incorporated, Rochester, N.Y., a corporation of New York
Filed Mar. 26, 1965, Ser. No. 442,928
7 Claims. (Cl. 350—181)

ABSTRACT OF THE DISCLOSURE

A zoom type of anamorphic eyepiece having a variable power cylindrical lens system for variably anamorphosing the image in one lateral direction, the system being an afocal type and being located between fixed front and rear relay lens systems.

---

The present invention relates to an anamorphic eyepiece for scientific instruments such as microscopes, etc., and more particularly it relates to a zoom type of anamorphic eyepiece.

Problems of matching two similar objects to be viewed simultaneously have arisen in the use of comparison microscopes and particularly in photogrammetry wherein pictures of the same area of terrain, which are taken at different camera angles, must be anamorphosed in one direction. In a photogrammetric stereo-viewer, it is often helpful, as above mentioned, to hold two pictures of the same area in the respective stereo fields of view of a stereo-viewer and anamorphose one of the dimensions of one of the pictures so that these pictures will serve as a stereo pair which will form an accurate stereo image in the field of view.

In view of the foregoing, it is an object of the present invention to provide a novel zoom type of anamorphosing eyepiece which may be substituted for the conventional microscope eyepiece in comparison microscopes such as photogrammetric stereo-viewers, said anamorphosing eyepiece serving to variably adjust the magnification of the image of an object along only one meridian or direction in the field of view.

It is a further object to provide such a device wherein the degree of the anamorphosing effect on said image is produced and controlled by a zoom type of cylindrical lens system preferably of the mechanically compensated type whereby an image of excellent optical quality may be produced in all parts of the range of magnification of said zoom system.

Further objects and advantages of the present invention will be apparent in the details and arrangement of its parts and in the combinations thereof, reference being had to the following specification and accompanying drawing for a full description and illustration of the invention.

In the drawings:

FIG. 1 is an optical diagram showing the component parts of the entire anamorphosing zoom lens system in one operating position; and FIG. 2 is an enlarged optical diagram similar to FIG. 1 showing only the lower part of the optical system.

With reference to FIG. 1 of the drawing, an optical system in the form of an anamorphic zoom type eyepiece is represented generally by the numeral 10, this device being substituted in place of the conventional eyepiece in a microscope, not shown, having a mounting shoulder M whereon the eyepiece is seated.

Comprised in said anamorphic eyepiece 10 is a front relay lens system 11 which is focused at the usual forwardly located eyepiece focal plane, not shown, an anamorphic zoom lens system generally designated 12, a rear relay lens system 13, and an eyepiece 14 of preferred optical properties, all components of which are arranged in optical alignment on an axis 15. It is contemplated to use two duplicate optical systems 10 in a stereo-microscope type of photogrammetric instrument, and for such a purpose, a deviation prism shown tentatively by dotted lines at 16 is provided so that the interpupillary distance may be adjusted to the needs of the observer.

The anamorphic zoom lens system 12 is advantageously designed to work in collimated light so that in the meridian or axial plane which lies normal to the plane of the drawing, the magnification of the image is 1:1. In the axial plane or meridian which lies in the plane of the drawing, the magnification of the image is varied through a range from 1:1 up to at least 1:2.78 measured in the focal plane 17 of the eyepiece 14.

Consequently, the front and rear relay lens systems 11 and 13 respectively are spaced at a distance equal to their respective focal lengths from their respective focal planes and said focal lengths are substantially equal to each other. It is also important to choose the focal lengths of said front and rear relay lenses 11 and 13 long enough to minimize the angular field but nevertheless short as possible to reduce the overall length of the optical system 10. It has been discovered that said focal lengths of the relay lens systems should preferably be substantially 50 mm. for the form of the invention here disclosed. Using such a focal length, the front relay system 10 transmits parallel light to the anamorphic system 12 and the rear relay system receives parallel light from system 12 in one meridian only or the single plane which includes all of the axes of every cylindrical surface.

With respect to the constructional forms of the lens parts in said system 10, the front relay lens system 11 comprises a front singlet positive lens member I and a rear doublet positive lens member II which are spaced from each other by an axial distance $S_1$, the lens members I and II preferably being plano-convex in form and having the plano surfaces turned away from each other. Lens member II includes a front double convex lens element which lies in contact with a concave-plano lens element at the rear. The front surface of lens member I is located at a distance $\alpha$ having a value which is $.606F < \alpha < .670F$ forwardly from said mounting shoulder M where F represents the focal length of said front relay lens system 11.

The anamorphic zoom system 12 magnifies the transmitted image in one meridian from 1:1 to 2.78× as above stated, and is composed entirely of cylindrical lenses which are all oriented in the same direction so as to have a common axial plane of unity magnification, i.e., all the refractive cylindrical surfaces on said lenses extend in the same direction and are symmetrical with respect to said common plane of unity magnification. By the above definition, the cylindrical axis of each of said cylindrical surfaces lies in a common axial plane which is the plane of unity magnification.

Comprised in said anamorphic zoom system 12 is a front positive singlet lens member III preferably of plano-convex form, the plano surface facing rearwardly. Lens member III is spaced at an axial distance $S_2$ rearwardly of lens member II as shown in FIG. 2 and the space is large enough to accommodate a deviation wedge 16 shown in dotted lines. Lens member III is stationary and a second positive lens member V is located at a fixed position rearwardly thereof. Between positive lens members III and V a movable singlet negative lens member IV is spaced and rearwardly of lens member V a second movable negative singlet lens member VI is located, the movable lens members IV and VI being differentially moved relative to said stationary lens members III and V in such a manner as to continuously vary the magnification of the transmitted image in one meridian or plane only as aforesaid, the image remaining at a substantially stationary position on the optical axis during the motion of the lens members IV and VI. Preferably, the positive lens member V is composed of a front and a rear double convex lens, the lens surfaces of steeper curvature in each lens facing each other.

The variable axial space between lens members III and IV is designated $S_3$, and between lens members IV and V the variable space is designated $S_4$ while the fixed space between the front and rear elements of lens member V is designated $S_5$. The variable axial space between lens members V and VI is designated $S_6$ and the variable space rearwardly of member VI is designated $S_7$.

Spaced at the variable axial distance $S_7$ from member VI is the aforesaid rear relay lens system 13 comprising a front double convex singlet lens member designated VII and a doublet lens member VIII, these members being spaced apart by a fixed axial distance designated $S_8$. Lens member VIII is composed of a front double convex lens element which is cemented to a rear preferably plano-concave lens element. The parallel rays entering the rear relay system 13 are brought to a focus forming a real image at a focal plane 17 as aforesaid, the distance therebetween being designated $S_9$ and the eyepiece 14 is provided for viewing said image. Various eyepieces 14 may be used depending on the magnification, size of field, eye relief and state of correction of aberrations desired by the observer.

The axial thicknesses of the successive lens members I to VIII and their component lens elements are designated $t_1$ to $t_{11}$.

For the attainment of the objects of the present invention, the constructional properties and data should have values as stated in Table I herebelow stated in terms of F which represents the focal length of the front relay lens system 11, the focal lengths of the successive lens members I to VIII being represented by $F_I$ to $F_{VIII}$, said air spaces $S_1$ to $S_9$ and said lens thicknesses $t_1$ to $t_{11}$ also being included, considering the movable lens members IV and VI to be in unity magnification position.

TABLE I $1.301F < F_I < 1.437F$
$.6863F < F_{II} < .7585F$
$.909F < F_{III} < 1.003F$
$.276F < F_{IV} < .306F$
$.3293F < F_V < .3649F$
$.422F < F_{VI} < .466F$
$1.393F < F_{VII} < 1.539F$
$2.417F < F_{VIII} < 2.671F$ $.968F < S_1 < 1.068F$
$.0599F < S_2 < .0661F$
$.0294F < S_3 < .0325F$
$.2415F < S_4 < .2669F$
$.00266F < S_5 < .00294F$
$.1840F < S_6 < .2032F$
$.2850F < S_7 < .3150F$
$.00228F < S_8 < .00252F$
$.7244F < S_9 < .8006F$ $.0630F < t_1 < .0770F$
$.0540F < t_2 < .0660F$
$.0270F < t_3 < .0330F$
$.9270F < t_4 < .0330F$
$.0270F < t_5 < .0330F$
$.0270F < t_6 < .0330F$
$.0252F < t_7 < .0308F$
$.0540F < t_8 < .0660F$
$.0828F < t_9 < .1012F$
$.1080F < t_{10} < .1320F$
$.0666F < t_{11} < .0814F$ wherein the minus (—) sign used with the $F_I$ to $F_{VIII}$ designations means negative focal length.

A further specification of the constructional data of the lens members I to VIII is given in Table II for the lens radii which are designated $R_1$ to $R_{20}$ and are given in terms of F, the accompanying minus (—) sign meaning that the surface is concave toward entrant light. Table II further specifies the values for the refractive index of the glass in the successive lens elements, the designations therefor being $n_D$ (I), $n_D$ (II pos.), $n_D$ (II neg.), $n_D$ (III), $n_D$ (IV), $n_D$ (V front), $n_D$ (V rear), $n_D$ (VI), $n_D$ (VII), $n_D$ (VIII pos.), $n_D$ (VIII neg.), and also specifies the values for Abbé number $\nu$ for said elements by the designations, $\nu$ (I), $\nu$ (II pos.), $\nu$ (II neg.), $\nu$ (III), $\nu$ (IV), $\nu$ (V front), $\nu$ (V rear), $\nu$ (VI), $\nu$ (VII), $\nu$ (VIII pos.), $\nu$ (VIII neg.).

TABLE II $R_1 > \pm 10.0F$
$.864F < -R_2 < 1.056F$
$.4023F < R_3 < .4917F$
$.2979F < -R_4 < .3641F$
$R_5 > \pm 10.0F$
$.5607F < R_6 < .6853F$
$R_7 > \pm 10.0F$
$.6543F < -R_8 < .7997F$
$.2691F < R_9 < .3289F$
$1.800F < R_{10} < 2.200F$
$.5067F < -R_{11} < .6193F$
$.5895F < R_{12} < .7205F$
$1.0368F < -R_{13} < 1.2672F$
$1.4967F < -R_{14} < 1.8293F$
$.3618F < R_{15} < .4422F$
$1.701F < R_{16} < 2.079F$
$1.701F < -R_{17} < 2.079F$
$.6642F < R_{18} < .8118F$
$.6642F < -R_{19} < .8118F$
$R_{20} > \pm 10.0F$ $1.695 < n_D$ (I) $< 1.705$
$1.615 < n_D$ (II pos.) $< 1.625$
$1.616 < n_D$ (II neg.) $< 1.626$
$1.646 < n_D$ (III) $< 1.656$
$1.715 < n_D$ (IV) $< 1.725$
$1.618 < n_D$ (V front) $< 1.628$
$1.618 < n_D$ (V rear) $< 1.628$
$1.715 < n_D$ (VI) $< 1.725$
$1.646 < n_D$ (VII) $< 1.656$
$1.509 < n_D$ (VIII pos.) $< 1.519$
$1.746 < n_D$ (VIII neg.) $< 1.756$ $43.0 < \nu$ (I) $< 53.0$
$55.0 < \nu$ (II pos.) $< 65.0$
$31.0 < \nu$ (II neg.) $< 41.0$
$53.0 < \nu$ (III) $< 63.0$
$37.0 < \nu$ (IV) $< 47.0$
$52.0 < \nu$ (V front) $< 62.0$
$52.0 < \nu$ (V rear) $< 62.0$
$31.0 < \nu$ (VI) $< 41.0$
$53.0 < \nu$ (VII) $< 63.0$
$65.0 < \nu$ (VIII pos.) $< 75.0$
$23.0 < \nu$ (VIII neg.) $< 33.0$ More specifically, the values for the constructional data are given in the consolidated Table III wherein the designations remain the same.

TABLE III $R_1$ = PLANO
$-R_2 = .960F$
$R_3 = .447F$
$-R_4 = .331F$
$R_5$ = PLANO
$R_6 = .623F$
$R_7$ = PLANO
$-R_8 = .727F$
$R_9 = .299F$
$R_{10} = 2.000F$
$-R_{11} = .563F$
$R_{12} = .655F$
$-R_{13} = 1.152F$
$-R_{14} = 1.663F$
$R_{15} = .402F$
$R_{16} = 1.890F$
$-R_{17} = 1.890F$
$R_{18} = .738F$
$-R_{19} = .738F$
$R_{20}$ = PLANO $t_1 = .070F$
$t_2 = .060F$
$t_3 = .030F$
$t_4 = .030F$
$t_5 = .030F$
$t_6 = .030F$
$t_7 = .028F$
$t_8 = .060F$
$t_9 = .092F$
$t_{10} = .120F$
$t_{11} = .074F$ $S_1 = 1.018F$
$S_2 = .063F$
$S_3 = .03096F$ [1]
$S_4 = .2542F$ [1]
$S_5 = .0028F$
$S_6 = .1936F$ [1]
$S_7 = .3000F$ [1]
$S_8 = .0024F$
$S_9 = .7625F$ $n_D$ (I) = 1.700
$n_D$ (II pos.) = 1.620
$n_D$ (II neg.) = 1.621
$n_D$ (III) = 1.651
$n_D$ (IV) = 1.720
$n_D$ (V front) = 1.623
$n_D$ (V rear) = 1.623

Footnote at end of table.

TABLE III—Continued $n_D$ (VI) = 1.720
$n_D$ (VII) = 1.651
$n_D$ (VIII pos.) = 1.514
$n_D$ (VIII neg.) = 1.751

$\nu$ (I) = 48.0
$\nu$ (II pos.) = 60.3
$\nu$ (II neg.) = 36.2
$\nu$ (III) = 58.4
$\nu$ (IV) = 42.0
$\nu$ (V front) = 56.9
$\nu$ (V rear) = 56.9
$\nu$ (VI) = 36.2

$\nu$ (VII) = 58.4
$\nu$ (VIII pos.) = 70.0
$\nu$ (VIII neg.) = 27.8

$F_I = 1.369F$
$F_{II} = .722F$
$F_{III} = .956F$
$-F_{IV} = .291F$
$F_V = .348F$
$-F_{VI} = .444F$
$F_{VII} = 1.466F$
$F_{VIII} = 2.544F$

[1] For unity magnification.

Particularly with regard to the variable air spaces $S_3$ to $S_7$, the specific values thereof for a progression of image magnifications within the range of .995× to 2.781× are given in Table IV herebelow in terms of F.

TABLE IV

| Magnification | $S_3$ | $S_4$ | $S_6$ | $S_7$ |
|---|---|---|---|---|
| 0.995× | .0309F | .2542F | .1936F | .3000F |
| 1.074× | .0509F | .2342F | .2082F | .2850F |
| 1.162× | .0709F | .2142F | .2238F | .2698F |
| 1.260× | .0909F | .1942F | .2303F | .2532F |
| 1.368× | .1109F | .1742F | .2579F | .2357F |
| 1.498× | .1309F | .1542F | .2765F | .2171F |
| 1.623× | .1509F | .1342F | .2961F | .1975F |
| 1.772× | .1709F | .1142F | .3166F | .1770F |
| 1.938× | .1909F | .0942F | .3278F | .1557F |
| 2.122× | .2109F | .0742F | .3595F | .1340F |
| 2.323× | .2309F | .0542F | .3812F | .1123F |
| 2.543× | .2509F | .0342F | .4025F | .0911F |
| 2.781× | .2709F | .0142F | .4223F | .0713F |

Although only a single specific form of the present invention has been shown and described in detail, other forms are possible and changes may be made in the details thereof and in the values of the constructional data within the ranges indicated without departing from the spirit of the invention as defined in the appended claims.

We claim:

1. The combination in an anamorphic zoom eyepiece for microscopes and the like of
    an anamorphic mechanically compensated zoom type lens system which works in collimated light and is composed of a plurality of optically aligned cylindrical lenses having the cylindrical surfaces thereof all lying in the same direction symmetrically of a common plane which includes the optical axis of said eyepiece,
    said anamorphic zoom lens system including two spaced positive lens members which are stationary and further including two movable negative lens members, one negative lens being located between said positive lens members and the other being spaced rearwardly from the rearmost positive zoom lens member, said negative lens members being coincidentally moved differentially with respect to the stationary lenses in such a manner that an image is formed at a substantially fixed position, said image being transmitted at unity magnification in said single plane and being anamorphosed from 1× to at least 2.78× in a second plane which is perpendicular to said single plane,
    a front relay spherical lens system which is optically aligned with said zoom system near the front stationary lens member and which collimates the light entering the last-named lens member, said relay system being focused on a preceding image formed by the objective of a microscope,
    a rear relay spherical lens system optically aligned with and spaced rearwardly from said zoom system at a fixed position so as to receive collimated light therefrom, said rear relay lens system forming a real image rearwardly thereof and having a focal length which is substantially equal to the focal length of the front relay lens system, and
    means for viewing said real image
    whereby the image formed by said microscope objective is varied in one meridian by the anamorphosing lens system in a continuous manner.

2. An anamorphic zoom eyepiece according to claim 1 wherein the focal length of both front and rear relay lens systems is substantially 50 mm.

3. An anamorphic zoom eyepiece according to claim 2 further characterized by
    said front relay lens system being composed of a front plano convex singlet lens and a rear plano convex doublet lens having their convex sides turned toward each other, said doublet including a double convex lens element on its front side which has a curvature weaker than its interface curvature, the focal length of the doublet being substantially .53 times the focal length of said singlet,
    said rear relay lens system being composed of a front double convex singlet lens of symmetrical form which is closely spaced from a rear doublet lens, said doublet lens having a focal length which is substantially 1.74 times the focal length of said singlet lens and is composed of a front symmetrical double convex lens element which is cemented to a rearward plano concave lens element.

4. A zoom type of anamorphosing eyepiece for a microscope comprising
    a front relay lens system which collimates incoming image rays and has a front positive lens designated I and a rear positive lens designated II spaced rearwardly therefrom at an axial distance designated $S_1$,
    a mechanically compensated zoom type of pancratic lens system which is located at an axial distance designated $S_2$ rearwardly of said front relay lens system and has a range of magnification from high to low values in one meridian only lying perpendicularly to a plane of unity magnification which includes the axis of said eyepiece wherein all of the lens surfaces are cylindrical and have their cylindrical axes lying in said plane of unity magnification whereby the image is anamorphosed,
    said pancratic lens system having two stationary positive lens members which are spaced apart, and further having two negative lens members which are coincidentally movable differentially with respect to the stationary lenses in such a manner that an image is formed in a substantially stationary axial position, the foremost positive lens designated III being plano convex in form and the other positive lens member designated V being a pair of closely spaced double convex singlets having their surfaces of weakest curvature turned toward each other, the foremost of said negative lens members being designated IV and being located between said positive members III and V and the other negative member being designated VI and being located on the opposite side of positive member V from the negative member IV,
    said eyepiece further comprising a rear relay lens system which is optically aligned with said front relay system and with said pancratic system to receive parallel light therefrom, said rear relay lens system forming a real image at an axial distance $S_9$ rearwardly thereof, and the last-named system having a front double concave singlet lens designated VII which is located at an axial distance $S_7$ rearwardly from lens VI and having a rearward positive doublet lens designated VIII which is located at a distance $S_8$ from lens VII, the specific values of the focal lengths $F_I$ to $F_{VIII}$ of the successive lens members I to VIII and of the successive air spaces $S_1$ to $S_9$ when said lens members III to VI are all located in a position for producing unity magnification being substantially as stated in the table hereunder wherein F designates the focal length of the front relay lens system,

| | |
|---|---|
| $F_I = 1.369F$ | $S_1 = 1.0180F$ |
| $F_{II} = .722F$ | $S_2 = .0630F$ |
| $F_{III} = .956F$ | $S_3 = .03096F$ |
| $-F_{IV} = .291F$ | $S_4 = .2542F$ |
| $F_V = .348F$ | $S_5 = .0028F$ |
| $-F_{VI} = .444F$ | $S_6 = .1936F$ |
| $F_{VII} = 1.466F$ | $S_7 = .3000F$ |
| $F_{VIII} = 2.544F$ | $S_8 = .0024F$ |
| | $S_9 = .7625F$ |

5. A zoom type of anamorphosing eyepiece for a microscope comprising a front relay lens system which collimates incoming image rays and has a front positive lens designated I and a rear positive lens designated II spaced rearwardly therefrom at an axial distance designated $S_1$, a mechanically compensated zoom type of pancratic lens system which is located at an axial distance designated $S_2$ rearwardly of said front relay lens system and has a range of magnification from high to low values in an anamorphosing plane lying normal to a plane of unity magnification which includes the axis of said eyepiece wherein all of the lens surfaces are cylindrical and have their cylindrical axes lying in said plane of unity magnification whereby the image is anamorphosed, said pancratic lens system having two stationary positive lens members which are spaced apart, and further having two negative lens members which are coincidentally movable differentially with respect to the stationary lenses in such a manner that an image is formed in a substantially stationary axial position, the foremost positive lens designated III being plano convex in form and the other positive lens member designated V being a pair of closely spaced double convex singlets having their surfaces of weakest curvature turned toward each other, the foremost of said negative lens members being designated IV and being located between said positive members II and V and the other negative member being desingated VI and being located on the opposite side of positive member V from the negative member IV, said eyepiece further comprising a rear relay lens system which is optically aligned with said front relay system and with said pancratic system to receive parallel light therefrom, said rear relay lens system forming a real image at an axial distance $S_9$ rearwardly thereof, and the last-named system having a front double concave singlet lens designated VII which is located at an axial distance $S_7$ rearwardly from lens VI and having a rearward positive doublet lens designated VIII which is located at a distance $S_8$ from lens VII, the specific values of focal lengths $F_I$ to $F_{VIII}$ of the successive lens members I to VIII being given hereinbelow along with the specific values of the successive air spaces $S_1$ to $S_9$ when the lens members III to VI are located in their respective positions for producing a series of image magnifications from unity to $2.78\times$ in said anamorphosing plane, the values for variables $S_3$, $S_4$, $S_6$ and $S_7$ being given in the latter part of the table in chart form as follows:

| | |
|---|---|
| $F_I = 1.369F$ | $F_{VIII} = 2.544F$ |
| $F_{II} = .722F$ | |
| $F_{III} = .956F$ | $S_1 = 1.0180F$ |
| $-F_{IV} = .291F$ | $S_2 = .0630F$ |
| $F_V = .348F$ | $S_5 = .0028F$ |
| $-F_{VI} = .444F$ | $S_8 = .0024F$ |
| $F_{VII} = 1.466F$ | $S_9 = .7625F$ |

| Magnification | $S_3$ | $S_4$ | $S_6$ | $S_7$ |
|---|---|---|---|---|
| 0.995× | .0309F | .2542F | .1936F | .3000F |
| 1.074× | .0509F | .2342F | .2082F | .2850F |
| 1.162× | .0709F | .2142F | .2238F | .2698F |
| 1.260× | .0909F | .1942F | [.2003F].2503F [.2179F] | .2532F |
| 1.368× | .1109F | .1742F | .2579F | .2357F |
| 1.498× | .1309F | .1542F | .2765F | .2171F |
| 1.623× | .1509F | .1342F | .2961F | .1975F |
| 1.772× | .1709F | .1142F | .3166F | .1770F |
| 1.938× | .1909F | .0942F | .3278F | .1557F |
| 2.122× | .2109F | .0742F | .3595F | .1340F |
| 2.323× | .2309F | .0542F | .3812F | .1123F |
| 2.543× | .2509F | .0342F | .4025F | .0911F |
| 2.781× | .2709F | .0142F | .4223F | .0713F |

6. A zoom type of anamorphosing eyepiece for a microscope comprising a front relay lens system having a foremost plano-convex lens member and a rear convex-plano doublet lens member, said lens members being designated I and II respectively and being air spaced from each other at an axial distance $S_1$, said relay lens system being constructed to collimate the image rays emerging from lens member II, a mechanically compensated zoom type of pancratic lens system having a stationary convex-plano lens member designated III and spaced at a distance $S_2$ rearwardly of lens II and optically aligned to receive parallel light therefrom, a movable double concave lens member designated IV which is spaced at a variable axial distance $S_3$ from lens member III, a pair of closely spaced stationary double convex lenses composing a lens member which is designated V, the space therebetween being designated $S_5$ and said member V being spaced at a variable axial distance designated $S_4$ from lens member IV, a double concave movable lens member designated VI located at a variable axial distance $S_6$ rearwardly of member V, said stationary member being positive in power and said movable members being negative in power, the lens members III to VI being characterized by cylindrical surfaces lying in a single direction, said movable members being coincidentally moved differentially with respect to said stationary members in such a manner as to form a stationary image which may be anamorphosed between magnifications of 1.1 to $2.78\times$ in an axial plane normal to said single axial plane, said eyepiece further comprising a rear relay lens system having a focal length substantially equal to said front relay system and is optically aligned to receive parallel light coming from said pancratic lens system, said rear relay lens system forming a real image at a stationary focal plane located at an axial distance designated $S_9$ rearwardly thereof and having a front double concave singlet lens VII which is spaced at an axial distance designated $S_8$ from a rearward positive doublet lens VIII, and lens means optically aligned for viewing said real image, the successive refractive surfaces of said lens members I to VIII being designated $R_1$ to $R_{20}$ and their axial thicknesses between said surfaces being designated successively $t_1$ to $t_{11}$, wherein the minus (−) sign used with the R designations signifies surfaces which are concave toward the front of said system, the specific values of R to $R_{20}$, $t_1$ to $t_{11}$ and $S_1$ to $S_9$ being given in the table of mathematical statements herebelow in terms of F which is the focal length of said front relay lens system,

| | |
|---|---|
| $R_1 = $ PLANO | $t_1 = .070F$ |
| $-R_2 = .960F$ | $t_2 = .060F$ |
| $R_3 = .447F$ | $t_3 = .030F$ |
| $-R_4 = .331F$ | $t_4 = .030F$ |
| $R_5 = $ PLANO | $t_5 = .030F$ |
| $R_6 = .623F$ | $t_6 = .030F$ |
| $R_7 = $ PLANO | $t_7 = .028F$ |
| $-R_8 = .727F$ | $t_8 = .060F$ |
| $R_9 = .299F$ | $t_9 = .092F$ |
| $R_{10} = 2.000F$ | $t_{10} = .120F$ |
| $-R_{11} = .563F$ | $t_{11} = .074F$ |
| $R_{12} = .655F$ | $S_1 = 1.018F$ |
| $-R_{13} = 1.152F$ | $S_2 = .063F$ |
| $-R_{14} = 1.663F$ | $S_3 = .03096F$ [1] |
| $R_{15} = 402F$ | $S_4 = .2542F$ [1] |
| $R_{16} = 1.890F$ | $S_5 = .0028F$ |
| $-R_{17} = 1.890F$ | $S_6 = .1936F$ [1] |
| $R_{18} = .738F$ | $S_7 = .3000F$ [1] |
| $-R_{19} = .738F$ | $S_8 = .0024F$ |
| $R_{20} = $ PLANO | $S_9 = .7625F$ |

[1] For unity magnification.

7. A zoom type of anamorphosing eyepiece for a microscope according to claim 6 further characterized by
the specific absolute values of the refractive index $n_D$ Abbe number $\nu$ being given in the table herebelow respectively by the designation $n_D$ (I) to $n_D$ (VIII) and $\nu$ (I) to $\nu$ (VIII),

| | |
|---|---|
| $n_D$ (I) = 1.700 | $\nu$ (I) = 48.0 |
| $n_D$ (II pos.) = 1.620 | $\nu$ (II pos.) = 60.3 |
| $n_D$ (II neg.) = 1.621 | $\nu$ (II neg.) = 36.2 |
| $n_D$ (III) = 1.651 | $\nu$ (III) = 58.4 |
| $n_D$ (IV) = 1.720 | $\nu$ (IV) = 42.0 |
| $n_D$ (V front) = 1.623 | $\nu$ (V front) = 56.9 |
| $n_D$ (V rear) = 1.623 | $\nu$ (V rear) = 56.9 |
| $n_D$ (VI) = 1.720 | $\nu$ (VI) = 36.2 |
| $n_D$ (VII) = 1.651 | $\nu$ (VII) = 58.4 |
| $n_D$ (VIII pos.) = 1.514 | $\nu$ (VIII pos.) = 70.0 |
| $n_D$ (VIII neg.) = 1.751 | $\nu$ (VIII neg.) = 27.8 |

References Cited

UNITED STATES PATENTS 2,500,017  3/1950  Altman _____ 350—181
2,924,145  2/1960  Landeau _____ 350—181

JOHN K. CORBIN, *Primary Examiner*,

UNITED STATES PATENT OFFICE
CERTIFICATE OF CORRECTION

Patent No. 3,410,629                                November 12, 1968

Vance J. Carpenter et al.

It is certified that error appears in the above identified patent and that said Letters Patent are hereby corrected as shown below:

Column 3, line 48, ".276F<$F_{IV}$<.306F" should read -- .276F<-$F_{IV}$<.306F --; line 50, ".422F<$F_{VI}$<.466F" should read -- .422F<-$F_{VI}$<.466F --; line 51, ".9270F<$t_4$<.0330F" should read -- .0270F<$t_4$<.0330F --. Column 7, lines 53 and 54, "members II and V" should read -- members III and V --. Column 8, in the table, fourth column, line 4 thereof, cancel "[.2003F]"; same table, fourth column, line 6 thereof, cancel "[.2179F]".

Signed and sealed this 24th day of March 1970.

(SEAL)
Attest:

EDWARD M. FLETCHER, JR.                        WILLIAM E. SCHUYLER, JR.
Attesting Officer                                     Commissioner of Patents